United States Patent [19]

Kuo et al.

[11] Patent Number: 5,171,089
[45] Date of Patent: Dec. 15, 1992

[54] SEMI-CONTINUOUS METHOD AND APPARATUS FOR FORMING A HEATED AND PRESSURIZED MIXTURE OF FLUIDS IN A PREDETERMINED PROPORTION

[75] Inventors: Alex C. Kuo, Charleston; James A. Condron, Hurricane; Kenneth L. Hoy, St. Albans, all of W. Va.

[73] Assignee: Union Carbide Chemicals & Plastics Technology Corporation, Danbury, Conn.

[21] Appl. No.: 792,381

[22] Filed: Nov. 15, 1991

Related U.S. Application Data

[62] Division of Ser. No. 544,777, Jun. 27, 1990, Pat. No. 5,098,194.

[51] Int. Cl.$^5$ .......................... B01F 15/02; B01F 15/06
[52] U.S. Cl. .................................. 366/146; 366/152; 366/162; 366/336
[58] Field of Search ............... 366/144, 145, 146, 147, 366/149, 141, 16–19, 151, 152, 160, 161, 348, 349, 136, 137, 159

[56] References Cited

U.S. PATENT DOCUMENTS

| | | | |
|---|---|---|---|
| 3,266,780 | 8/1966 | Waters | 366/152 |
| 4,096,585 | 6/1978 | Fiorentini | 366/144 |
| 4,171,191 | 10/1979 | Krueger | 366/161 |
| 4,407,431 | 10/1983 | Hutter | 366/137 |
| 4,582,731 | 4/1986 | Smith | 427/421 |
| 4,734,227 | 3/1988 | Smith | 264/13 |
| 4,734,451 | 3/1988 | Smith | 524/493 |
| 4,832,499 | 5/1989 | Fiorentini | 366/152 |
| 4,836,685 | 6/1989 | Verreault | 366/152 |
| 4,881,820 | 11/1989 | Luckhoff | 366/162 |
| 4,923,720 | 5/1990 | Lee et al. | 427/422 |
| 5,009,367 | 4/1991 | Nielsen | 239/3 |
| 5,057,342 | 10/1991 | Hoy et al. | 427/422 |

Primary Examiner—Robert W. Jenkins
Attorney, Agent, or Firm—M. N. Reinisch

[57] ABSTRACT

The present invention is directed to apparatus and methods for effectively supplying, feeding, measuring, proportioning, mixing, pressurizing, and heating on a semi-continuous basis, a plurality of fluids. Preferably, the fluids comprise at least one substantially non-compressible fluid, such as coating formulation, and at least one substantially compressible fluid, such as carbon dioxide, to form a substantially accurately proportionated coating admixture in the supercritical state of the compressible fluid for spraying the combined mixture through a spraying means onto a substrate to produce a coating. The process employs vessels having a known displacement volume to feed and proportion the fluids. The pressurization, mixing and heating is accomplished in an oscillation loop wherein the mixture is pressurized and heated while in such oscillation loop. A spray gun connected to the oscillation loop is used to spray the mixture.

51 Claims, 2 Drawing Sheets ated coating formulation. This particularly occurs when the vol-
SEMI-CONTINUOUS METHOD AND APPARATUS FOR FORMING A HEATED AND PRESSURIZED MIXTURE OF FLUIDS IN A PREDETERMINED PROPORTION This application is a division of prior U.S. application Ser. No. 07/544,777, filed Jun. 27, 1990, now U.S. Pat. No. 5,098,194.

RELATED PATENT APPLICATIONS

This application contains subject matter related to U.S. application Ser. No. 418,820, filed Oct. 4, 1989, now U.S. Pat. No. 4,923,720, issued May 8, 1990. This application also contains subject matter related to U.S. patent applications Ser. No. 218,896, filed Jul. 14, 1988, Ser. No. 218,910, filed Jul. 14, 1988 and Ser. No. 413,517, filed Sep. 27, 1989.

FIELD OF THE INVENTION

This invention, in its more broader embodiment, pertains to the field of effectively mixing, heating and pressurizing a plurality of fluids on a semi-continuous basis in a simple and elegant manner utilizing apparatus that is both economical, efficient and capable of being easily transportable. In another embodiment of the present invention, methods and apparatus are provided for supplying a predetermined, proportioned amount of a plurality of fluids to the mixing, heating and pressurizing embodiment of the present invention. More specifically, the present invention, in its more preferred embodiments, is directed to semi-continuous apparatus and methods for forming a heated and pressurized coating composition mixture containing a substantially accurately proportionated amount of at least one supercritical fluid used as a viscosity reduction diluent. The resultant admixed properly proportioned fluid mixture can then be sprayed onto a substrate to be coated.

BACKGROUND OF THE INVENTION

In essentially every process in which a mixture is prepared for a particular purpose, the constituents of that mixture usually need to be present in particular, proportionated amounts in order for the mixture to be effective for its intended use. In the aforementioned related patent applications, the underlying objective is to reduce the amount of organic solvent present in a coating formulation by the use of supercritical fluid, particularly, supercritical carbon dioxide. Understandably, with this objective in mind, it is generally desirable to utilize as much supercritical fluid as possible while still retaining the ability to effectively spray the liquid mixture of coating formulation and supercritical fluid and also obtain a desirable coating on the substrate. Accordingly, here too, it is particularly preferred that there be prescribed, proportionated amounts of supercritical fluid and of coating formulation present in the liquid coating mixture to be sprayed.

Generally, the preferred upper limit of supercritical fluid addition is that which is capable of being miscible with the coating formulation. This practical upper limit is generally recognizable when the admixture containing coating formulation and supercritical fluid breaks down from one phase into two fluid phases.

To better understand this phenomenon, reference is made to the phase diagram in FIG. 1 wherein the supercritical fluid is supercritical carbon dioxide fluid. In FIG. 1, the vertices of the triangular diagram represent the pure components of an admixed coating formulation which for the purpose of this discussion contains no water. Vertex A is a solvent, vertex B is carbon dioxide and vertex C represents a polymeric material. The curved line BFC represents the phase boundary between one phase and two phases. The point D represents a possible composition of a coating formulation in which supercritical carbon dioxide has not been added. The point E represents a possible composition of an admixed coating formulation after admixture with supercritical carbon dioxide.

Thus, after atomization, a majority of the carbon dioxide vaporizes, leaving substantially the composition of the original coating formulation. Upon contacting the substrate, the remaining liquid mixture of the polymer and solvent(s) component(s) will flow, i.e., coalesce, to produce a uniform, smooth film on the substrate. The film forming pathway is illustrated in FIG. 1 by the line segments EE'D (atomization and decompression) and DC (coalescence and film formation).

However, the amount of supercritical fluid, such as supercritical carbon dioxide, that can be mixed with a coating formulation is generally a function of the miscibility of the supercritical fluid with the coating formulation as can best be visualized by referring to FIG. 1.

As can be seen from the phase diagram, particularly as shown by arrow 100, as more and more supercritical carbon dioxide is added to the coating formulation, the composition of the admixed liquid coating mixture approaches the two-phase boundary represented by line BFC. If enough supercritical carbon dioxide is added, the two-phase region is reached and the composition correspondingly breaks down into two fluid phases. Sometimes, it may be desirable to admix an amount of supercritical fluid (in this case, supercritical carbon dioxide) which is even beyond the two phase boundary. Generally, however, it is not preferable to go much beyond this two phase boundary for optimum spraying performance and/or coating formation.

In addition to avoiding the two-phase state of the supercritical fluid and the coating formulation, proper proportionation is also desirable to provide optimum spraying conditions, such as, formation of desired admixed viscosity, formation of desired particle size, formation of desired sprayed fan shape, and the like.

Accordingly, in order to spray liquid coating formulations containing supercritical fluid as a diluent on a continuous, semi-continuous, and/or an intermittent or periodic on-demand basis, it is necessary to prepare such liquid coating formulations in response to such spraying by accurately mixing a proportioned amount of the coating formulation with the supercritical fluid. However, the compressibility of supercritical fluids is much greater than that of liquids. Consequently, a small change in pressure or temperature results in large changes in the density of the supercritical fluid.

The compressibility of the supercritical fluids causes the flow of these materials, through a conduit and/or pump, to fluctuate. As a result, when mixed with the coating formulation, the proportion of supercritical fluid in the resulting admixed coating formulation also correspondingly fluctuates instead of being uniform and constant. Moreover, the compressibility of liquid carbon dioxide at ambient temperature is high enough to cause flow fluctuations to occur when using reciprocating pumps to pump and proportion the carbon dioxide with the coating formulation to form the admixed coating formulation. This particularly occurs when the volume of liquid carbon dioxide in the flow path between the pump and the mixing point with the coating formulation is too large. The fluctuation can be promoted or accentuated by any pressure variation that occurs during the reciprocating pump cycle.

In an embodiment discussed in a number of the aforementioned related patent applications, (U.S. application Ser. Nos. 218,896 and 218,910) an apparatus is disclosed for pumping and proportionating a non-compressible fluid, i.e., a coating formulation with a compressible fluid, liquid carbon dioxide, for example, in order to prepare the ultimate mixture to be sprayed comprised of the coating formulation and the carbon dioxide in its supercritical state. In that embodiment, volumetric proportionating of the coating formulation stream and the liquid carbon dioxide stream is carried out by means of reciprocating pumps which displace a volume of fluid from the pump during each one of its pumping cycles. One reciprocating pump is used to pump the coating formulation which is slaved to another reciprocating pump which is used to pump the liquid carbon dioxide. The piston rods for each pump are attached to opposite ends of a shaft that pivots up and down on a center fulcrum. The volume ratio is varied by sliding one pump along the shaft, which changes the stroke length.

However, liquid carbon dioxide is relatively compressible at ambient temperature, the temperature at which it is typically stored in a pressurized container. Such compressibility may undesirably cause fluctuations and oscillations of the amount of carbon dioxide that is present in the admixed coating formulation that is to be sprayed. This occurs due to the incompatible pumping characteristics of the relatively non-compressible coating formulation and the relatively compressible liquid carbon dioxide. With the coating formulation, pressure is immediately generated in the reciprocating pump as soon as its volume is displaced. Inasmuch as the liquid carbon dioxide is substantially compressible, a larger volume is needed to be displaced in order to generate the same pressure. Because mixing occurs when the flow of the coating formulation and of the liquid carbon dioxide are at the same pressure, the flow rate of carbon dioxide lags behind the flow rate of the coating formulation.

This fluctuation is accentuated if the driving force operating the pump varies during the operating cycle, such as an air motor changing direction during its cycle. Thus, if the driving force declines, the pressure in the coating formulation flow declines even more rapidly, due to its non-compressibility, than the pressure in the liquid carbon dioxide flow, due to its being compressible.

Accordingly, the pressures generated in both flows may be out of phase during the pumping cycle, such that the proportion of carbon dioxide in the mixture to be sprayed also varies. This fluctuation is made even more severe if cavitation also occurs in the carbon dioxide pump due to vapor formation as the pump fills.

While some of these fluctuations and problems have been suppressed by refrigerating the liquid carbon dioxide to low temperatures such as below 10° C., and even below 0° C., prior to its entering the reciprocating pump, a need still existed to avoid substantially all inaccuracies that may be present in the proportionation of the non-compressible coating formulation and the compressible liquid carbon dioxide to form the desired admixture. Indeed, a need existed to provide a means to accurately proportion any compressible fluid with a non-compressible fluid.

That need was met in the aforementioned related patent application, U.S. patent application Ser. No. 413,517, filed Sep. 27, 1989, wherein apparatus and methods are disclosed for accurately and continuously providing a proportionated mixture comprised of non-compressible fluid and compressible fluid for spraying upon a substrate to be coated, relying particularly upon mass proportionation, to obtain the desired mixture of the compressible and non-compressible fluids.

Generally, the apparatus of U.S. patent application Ser. No. 413,517 comprises:

a) means for supplying substantially compressible fluid;

b) means for measuring the mass flow rate of the substantially compressible fluid;

c) means for generating a signal in response to the measured mass flow rate of the substantially compressible fluid;

d) means for supplying substantially non-compressible fluid;

e) means for controlling the flow rate of the substantially non compressible fluid responsive to the signal generated in (c); and f) means for forming a mixture of the measured compressible fluid and the controlled non-compressible fluid.

The broadest method disclosed in that application for forming a mixture of a substantially compressible fluid and a substantially non-compressible fluid in a predetermined proportion includes:

a) supplying substantially compressible fluid;

b) measuring the mass flow rate of the substantially compressible fluid;

c) generating a signal in response to the measured mass flow rate of the substantially compressible fluid;

d) supplying substantially non-compressible fluid;

e) controlling the flow rate of the substantially non-compressible fluid responsive to the signal generated in (c); and f) forming a mixture of the measured compressible fluid and the controlled non-compressible fluid.

As used in that application and as used herein the phrase "compressible fluid" is meant to include a material whose density is affected by a change in pressure to an extent of at least about 2 percent.

Specifically, the mass flow rate of the compressible fluid is continuously and instantaneously measured. Regardless of what that flow rate is and whether or not it is fluctuating as a result of, for example, being pumped by a reciprocating pump or regardless of the state in which such compressible fluid is in, that mass flow rate information is fed to a signal processor on a continuous and instantaneous manner. Based on that received information, the signal processor in response to the amount of compressible fluid that has been measured, controls a metering device which controls the rate of flow of the non-compressible fluid. The non-compressible fluid is then metered in a precise predetermined proportion relative to the compressible fluid flow rate such that when the compressible and non-compressible fluids are subsequently mixed, they are present in the admixed coating formulation in the proper proportions.

By measuring the mass flow rate of the substantially compressible fluid, and then controlling the amount of non-compressible fluid in response thereto, the problems associated with the compressibility of the compressible fluid and the problems associated with phase changes of the compressible fluid, such as vaporization or condensation, are substantially eliminated. Any fluctuations or oscillations present in the flow of the compressible fluid are instantaneously measured and are compensated by controlling the amount of non compressible fluid to provide the prescribed proportionation for the desired mixture. In contrast to past techniques, the present embodiment involves the metering, i.e., controlling the flow rate, of only one fluid, namely, the noncompressible fluid. The flow rate of the compressible fluid is not controlled, but rather only measured, from which measurement the prescribed amount of non-compressible fluid is correspondingly adjusted to provide the desired proportionation. This allows for total flexibility of the system and provides for a simple and effective means for producing the desired proportionated mixture of compressible and non-compressible fluids.

The apparatus and methods disclosed in application Ser. No. 413,517, however, are particularly effective and specifically focused for producing the desired proportionated mixture of compressible and noncompressible fluids on a relatively large scale, continuous basis. The inventions disclosed in that Application are most suitable for substantially large industrial facilities wherein the substrate to be coated typically is transported on a conveyor system past one or more spray guns, which may be stationary or moving, to be sprayed by the apparatus disclosed therein. Such systems, and the like, may generally be used to coat automobile parts; electric motors; containers; pipe; coil steel, paper, fabric and other materials that are coated as they are rewound; plywood; porcelain enameling stove parts; adhesive on panels and honeycomb for laminating; sheet metal parts such as washers, dryers, refrigerators and the like; automotive bodies; furniture; case goods; and heavy machinery.

There are applications, however, wherein the continuous apparatus of the scale and sophistication envisaged in application Ser. No. 413,517 cannot meet on a practical and economical manner. Thus, for example, the automobile refinish industry, and small "end-use" shop and field spraying operations, and the like, where "economics-of-scale" dictate low cost equipment and a simple mode of operation, cannot effectively utilize the type of equipment disclosed in application Ser. No. 413,517. What is needed is a simple, semi-continuous method and apparatus, which is portable and small in scale; for example, about, but not restricted to, a fluid output of about 0.01 to 0.2 gallon per minute and a total capacity of about 0.1 to 1 gallon in the spraying system.

Although smaller in size, this system still must be able to feed, accurately proportion, pressurize, heat and mix a plurality of fluids, particularly one or more compressible fluids with one or more non-compressible fluids, and then be able to spray such mixed, heated and pressurized fluids through a spray gun. Most preferably, this relatively small-scale, semi-continuous unit should be able to accurately proportion, pressurize, heat and mix a coating material with a supercritical fluid, such as supercritical carbon dioxide, and spray such a mixture at supercritical conditions. Moreover, the apparatus should also be able to avoid settling of the contents of the mixed fluids such as when preparing, for example, a pigmented coating system; be easily cleaned when color changes are necessary; minimize the amount of solvent emissions to the environment; have a minimum of dead space; provide for circulating the coating fluid continuously through the spray system and gun to maintain precise temperature and pressure control; and have a minimum of moving parts requiring seals from which leaks may occur.

SUMMARY OF THE INVENTION

By virtue of the present invention, essentially all of the above needs have now been met. Methods and apparatus have been discovered which are capable, on a relatively small-scale, of accurately and semi-continuously providing a proportionated, heated, and pressurized mixture of a plurality of fluids. While the present invention may be utilized with any combination of fluids, it is particularly advantageous for use with a mixture of non-compressible and compressible fluids, and features the formation of a mixture of coating formulation and a supercritical fluid, such as supercritical carbon dioxide, which is sprayed onto a substrate.

It is to be understood that while the present invention is directed to a small-scale apparatus, the concepts disclosed here may readily be used for producing a large scale apparatus as well and it is within the scope of the present invention to include such an embodiment.

In its most simplest terms, the present invention involves the introduction of a predetermined, proportionated amount of two or more fluids into two or more vessels capable of being pressurized, wherein the fluids are then oscillated from one of the vessels to the other, preferably in a synchronized fashion. Desirably, in preferred embodiments, these vessels comprise accumulators in which the fluids are displaced from one accumulator to the other. The pressure applied to the fluids for conveying them from one vessel to the other is adjusted to arrive at a predetermined final system pressure for the ultimate product mixture. So too, means are provided for heating the fluids as they are being oscillated between the vessels, either in the vessels or in the oscillating loop which connects the two or more vessels. Mixing of the fluids is accomplished by the oscillation itself and desirably may be enhanced by the incorporation of a static mixer in the oscillating loop. By connecting a spray gun having a circulation loop to the oscillating loop, a user can spray the mixed, heated and pressurized fluids in a continuous or intermittent manner, while the fluids are still being oscillated from one vessel to the other thereby desirably maintaining the fluids in a mixed, heated and pressurized state at a set of predetermined conditions.

More specifically, the present invention, in its broader embodiment, comprises an apparatus for mixing, heating and pressurizing two or more fluids including:

a) at least two or more vessels capable of being pressurized;

b) means communicating between said vessels for conveying the fluids from one or more of the vessels to one or more of the other of said vessels;

c) means for continuously oscillating the fluids through the communicating means from at least one of said vessels to at least one of the other of said vessels, where said oscillation of the fluids provides for their mixing;

d) means for pressurizing the fluids as they are being oscillated between the vessels; and e) means for heating the fluids as they are being oscillated between the vessels.

Also in its more broader embodiment, the present invention comprises a method for mixing, heating and pressurizing two or more fluids comprising:

a) supplying the fluids to at least one of at least two or more vessels capable of being pressurized;

b) oscillating the fluids from at least one of said vessels to at least one of the other of said vessels, where said oscillation of the fluids provides for their mixing;

c) pressurizing the fluids as they are being oscillated between the vessels; and d) heating the fluids as they are being oscillated between the vessels.

Moreover, the present invention is also directed to providing a predetermined proportionated amount of two or more fluids to the oscillating loop discussed above. Thus, rather than utilizing the volumetric or mass proportionating types of apparatus discussed above, the present invention relies upon accumulating a known predetermined volume of a first fluid, such as a compressible fluid, in a fixed-volume container at a predetermined temperature and pressure and then conveying said fluid from said container to the oscillating mixing system. Since the temperature, pressure and volume are known and fixed, an exact and accurately known mass of the first fluid, whether it be compressible or not, is introduced into the oscillating mixing loop process. In a like manner, the second fluid, which may comprise, for example, a non-compressible fluid, is measured and conveyed into the oscillating mixing loop. Accordingly, the oscillating loop now contains a known and desired predetermined mass proportioned amount of the fluids, e.g., the compressible and non-compressible fluids, and does so in a very simple and elegant manner. Because no pumping of either fluid is undertaken at this stage, the fluctuation phenomenon due to the inherent nature of reciprocating pumping is not a factor, nor is there a need for sophisticated mass measuring and proportionation devices to overcome that deficiency.

Accordingly, in a preferred embodiment, the apparatus of the present invention for forming a heated and pressurized mixture of two or more fluids in a predetermined proportion comprises:

a) means for supplying two or more fluids to two or more primary vessels, one fluid being supplied to one primary vessel, respectively, each primary vessel having a known volume at a predetermined pressure and temperature;

b) means for removing at least a portion of each of the fluids from each of the respective primary vessels;

c) means present on at least one or more of the primary vessels for measuring the mass of a fluid leaving said at least one more primary vessels;

d) at least two or more secondary vessels capable of being pressurized for receiving the fluids leaving the primary vessels;

e) means communicating between said secondary vessels for conveying the fluids from one or more of the secondary vessels to one or more of the other of said secondary vessels;

f) means for continuously oscillating the fluids through the communicating means from at least one of said secondary vessels to at least one of the other of said secondary vessels, where said oscillation of the fluids provides for their mixing;

g) means for pressurizing the fluids as they are being oscillated between the secondary vessels; and h) means for heating the fluids as they are being oscillated between the secondary vessels.

Correspondingly, the method for forming a heated and pressurized mixture of two or more fluids in a predetermined proportion in accordance with the present invention comprises:

a) supplying two or more fluids to two or more primary vessels, one fluid being supplied to one primary vessel, respectively, each primary vessel having a known volume at a predetermined pressure and temperature;

b) removing at least a portion of one or more of the fluids from a primary vessel, respectively, measuring the mass of each of the fluids removed, and introducing the removed fluids to at least one of at least two or more secondary vessels capable of being pressurized;

c) removing at least a portion of one or more of the other fluids remaining in the primary vessels in a predetermined proportion, based on the mass of said fluids, relative to the amount of fluids removed in step (b) and introducing the removed other fluids to at least one of the at least two or more secondary vessels capable of being pressurized;

d) oscillating the fluids from at least one of said secondary vessels to at least one of the other of said secondary vessels, where said oscillation of the fluids provides for their mixing;

c) pressurizing the fluids as they are being oscillated between the secondary vessels; and e) heating the fluids as they are being oscillated between the secondary vessels.

In a more preferred embodiment, the present invention comprises apparatus and methods of relatively small scale for mixing a substantially non-compressible fluid and a substantially compressible fluid by conveying each fluid, in any order, into two or more vessels containing a reciprocating piston, preferably an accumulator, and then oscillating the fluids between the two or more vessels through a static mixture until complete mixing of the two or more fluids is accomplished while simultaneously heating and pressurizing the two or more fluids to a predetermined level, which oscillating loop between the two or more vessels contains a spraying means for spraying said mixture onto a substrate. The small-scale apparatus of the present invention, particularly by enabling the use of commercially available accumulators which are used here in a novel manner, allows for simplicity, efficiency and portability. It also facilitates purging the apparatus for cleanup, such that minimum organic solvent is required thereby minimizing the undesirable loss of solvent to the environment. This is particularly desirable where the apparatus is to be cleaned for color change purposes when coating formulation is being utilized.

While the prior art discloses different apparatus for proportioning and mixing fluids, it does not disclose or suggest an apparatus that is capable of preparing a mixture of a predetermined ratio which is also heated and pressurized to a desired extent, particularly a mixture of a compressible and non-compressible fluid, in the simple and efficient manner as in the present invention which utilizes an oscillation loop.

U.S. Pat. No. 4,708,088, issued Nov. 24, 1987, for example, discloses a transportable, airless spraying method and apparatus for spraying paint which includes a portable pressurized accumulator containing the paint wherein the paint is transferred from a supply container and/or an open funnel device, which is open to the atmosphere, by an electrical power driven piston pump to said accumulator. When the accumulator is L filled, its pressure is specified to be at 800 psig, and at that instant a pressure switch deactivates the piston pump drive thereby shutting off the flow of paint to the accumulator. When spraying is initiated by activating the spray gun, paint is delivered from the accumulator to said gun and sprayed through a suitable orifice to the substrate. During this period, the pressure in the accumulator is allowed to diminish to 400 psig, at which time the pressure switch again activates the piston pump drive thereby delivering additional paint to the accumulator. Thus, the pressure of the paint being supplied to the spraying device undesirably fluctuates between 800 psig to 400 psig while spraying continues. When the accumulator is removed from the paint supplying apparatus for remote painting it, of course, acts in a batch mode delivering only one accumulator charge.

The apparatus disclosed in U.S. Pat. No. 4,708,088 cannot be utilized for the preferred objectives of the present invention. As discussed above, because of the nature of a highly compressible fluid, such as supercritical carbon dioxide, adaptation of the method disclosed in U.S. Pat. No. 4,708,088 is not feasible. In its preferred embodiment, it is the objective of the present invention to accurately proportion a supercritical fluid, on a known mass basis, with a non-compressible formulation, and then deliver the resulting admixture to the spray gun in a single-phase state. The severe pressure fluctuations, as would be present in the apparatus of U.S. Pat. No. 4,708,088, would cause, at the very least, undesirable vaporization of the supercritical carbon dioxide, resulting in two phases being present in the spray gun which is likely to cause improper atomization and an inferior coating quality. Moreover, the apparatus disclosed in U.S. Pat. No. 4,708,088 does not provide for a means of heating the fluids, much less, maintaining the fluids at a specific temperature level above that of the environment. Such a heating means, however, is necessary in the preferred embodiments of the present invention in which the temperature of one or more of the fluids is required to be raised and maintained above its critical temperature. In fact, with many of these compressible fluids, and particularly with carbon dioxide, the 400 psig to 800 psig pressure range and upper limit recited in U.S Pat. No. 4,708,088, does not even closely approach the critical pressure of carbon dioxide (1057.4 psig) to which, as in accordance with the preferred embodiments of the present invention, the pressure of the mixture is raised. Hence, aside from the use of an accumulator, the apparatus of U.S. Pat. No. 4,718,008 is totally deficient for achieving the objectives of the present invention.

An approach to proportional metering, using a single drive source, is disclosed in U.S. Pat. No. 3,967,634, issued Jul. 6, 1976, wherein a reciprocating drive motor coupled to two or more metering cylinders through variable lever arms causes, through its stroke, a measured and predetermined stroke of each of the metering cylinders and thereby providing different volumetric flow rates depending upon stroke adjustment.

Another approach to metering liquids is disclosed in U.S. Pat. No. 3,107,034, issued Oct. 15, 1963, wherein reciprocating hydraulic pumps are driven by pressurized hydraulic oil provided by an electric motor and pump combination. The pressurized hydraulic oil is selectively valved into each of the hydraulic pumps, thereby controlling the speed of reciprocation of the respective pumps, and correspondingly the volumetric rate of flow of the pumped material. This type of system requires bypass valves and other safeguards to prevent burnout of the electric drives under conditions where the pumps are in a "stalled mode" when back pressure develops in the process system.

An improvement is disclosed in U.S. Pat. No. 4,505,405, issued Mar. 19, 1985, wherein a system for pumping liquid materials with reciprocating pumps is driven by hydraulically operated motors driven by hydraulic oil. Here, the hydraulic oil is used to drive the hydraulic motors via reciprocating proportioners. The reciprocating proportioners are driven by reciprocating air motors operated under predetermined air pressure. In this manner, system operation is such that the air motors will "stall" when the system back pressure balances the air motor applied pressure and, therefore, limits the pressure applied to the reciprocating pumps and also the output pressure of the pumped liquid materials. This is accomplished without the need of special safeguards to protect the air motors against damage.

U.S. Pat. Nos. 4,019,652 and 4,170,319, issued Apr. 26, 1977 and Oct. 9, 1979, respectively, disclose systems for mixing two fluid components in a predetermined flow rate ratio for delivery of large amounts, or shots, of mixed plastic or other fluid components to molds. In one embodiment, the individual components are charged, each at a selected predetermined pressure, to independent accumulators with the independent pressures selected, and predetermined ratio of the sizes of input ports to a mixing device, to provide for the desired mass flow ratio.

In U.S. Pat. No. 4,522,789, issued Jun. 11, 1985, a system and method of mixing and dispensing two liquid components is disclosed, in which the two components are chemically reactive when combined in certain ratios. The system includes separate storage containers and pumps for delivering each of the reactive components through a common mixing manifold, and from there to a dispensing apparatus; the system further including a pump in one of the containers for delivering liquid through a valved closed loop subsystem back to the container, the closed loop having an entry point for connection to the dispensing apparatus. The pumps used for delivering all liquids are reciprocating piston pumps, some of which are driven by reciprocable air drivers.

U.S. Pat. No. 3,912,127, issued Oct. 14, 1975, discloses a fluid metering system that uses a positive displacement pump, together with a pump stroke displacement transducer and electronic control circuitry for providing compensation for leakages and discontinuities resent in the physical pumping system, particularly compensating for losses in the amount of fluid pumped during both the top and bottom change-over portion of the pump's stroke, as a function of linear piston position, when the pump piston reverses its direction of travel in its cylinder. Compensation by electronic circuitry is also provided for regions of pump stroke displacement which result in a reduction of fluid output per unit increment of piston movement, and for errors in the quantity of fluid dispensed due to valuing delays in the system.

These methods and apparatus generally rely upon reciprocating devices to deliver at least two fluids to a mixing device in a predetermined volumetric ratio in an attempt to provide for and maintain a desired mass ratio of the two fluids.

While such methods and apparatus may be adequate to deliver two or more non-compressible liquids in a predetermined ratio, they may be totally inadequate to do so when one or more of the fluids is a compressible fluid. This is due to the fluctuations which may occur as a result of the pressure changes, causing inaccuracies in the proportionation. Moreover, the prior art, as shown by the above patents, also does not disclose or suggest a simple and elegant heating, mixing and pressurizing system, as that of the present invention, which comprises the oscillation of fluids between two or more vessels, preferably accumulators.

DETAILED DESCRIPTION OF THE INVENTION

Figure 1:
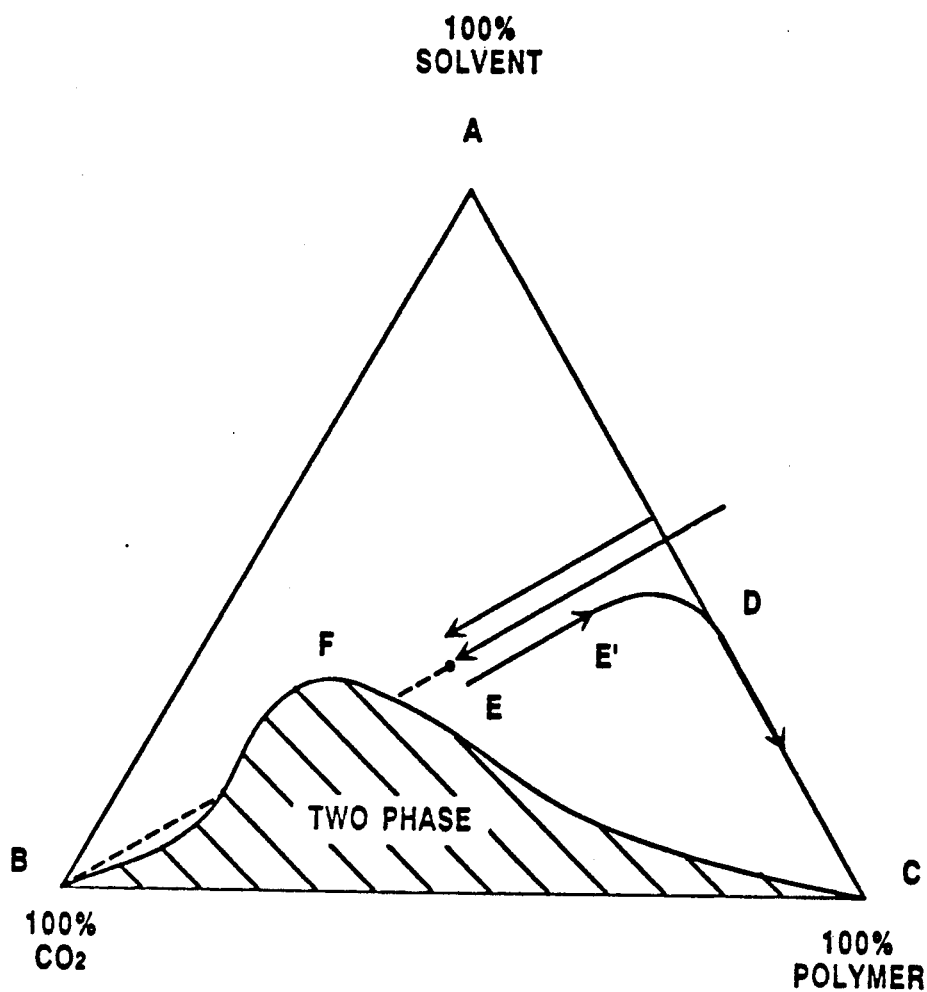
FIG. 1 is a phase diagram of a supercritical carbon dioxide fluid spray coating.

It is understood that while the following discussion will primarily focus upon providing a proportionated admixed liquid mixture of a coating formulation and supercritical fluid, such as carbon dioxide, which is suitable for being sprayed onto a substrate, the present invention is in no way limited to this preferred embodiment. As is readily apparent from the foregoing discussion, the present invention encompasses the proportionation and mixing, heating and pressurization of any plurality of fluids, but is particularly advantageous for preparing a mixture of compressible and non-compressible fluids, to form a desired mixture for any intended subsequent use.

As used herein, the phrases "coating formulation" or "coating composition" are understood to mean a typical, conventional coating composition which does not have any supercritical fluid admixed therewith. Also as used herein, the phrases admixed liquid mixture" or "admixed coating formulation" are meant to include an admixture of a coating formulation with at least one supercritical fluid.

Because of its relevancy to the present invention, a brief discussion of supercritical fluid. phenomena is believed to be warranted.

Supercritical fluid phenomenon is well documented, see pages F-62–F-64 of the CRC Handbook of Chemistry and Physics, 67th Edition, 1986–1987, published by the CRC Press, Inc., Boca Raton, Fla. At high pressures above the critical point, the resulting supercritical fluid, or "dense gas", will attain densities approaching those of a liquid and will assume some of the properties of a liquid. These properties are dependent upon the fluid composition, temperature, and pressure. As used herein the "critical point" is the transition point at which the liquid and gaseous states of a substance merge into each other and represents the combination of the critical temperature and critical pressure for a given substance. The "critical temperature", as used herein, is defined as the temperature above which a gas cannot be liquefied by an increase in pressure. The "critical pressure", as used herein, is defined as that pressure which is just sufficient to cause the appearance of two phases at the critical temperature.

The compressibility of supercritical fluids is great just above the critical temperature where small changes in pressure result in large changes in the density of the supercritical fluid. The "liquid-like" behavior of a supercritical fluid at higher pressures results in greatly enhanced solubilizing capabilities compared to those of the "subcritical" compound, with higher diffusion coefficients and an extended useful temperature range compared to liquids. Compounds of high molecular weight can often be dissolved in the supercritical fluid at relatively low temperatures. An interesting phenomenon associated with supercritical fluids is the occurrence of a "threshold pressure" for solubility of a high molecular weight solute. As the pressure is increased, the solubility of the solute will often increase by many orders of magnitude with only a small pressure increase. The solvent capabilities of the supercritical fluid, however, are not essential to the broad aspects of the present invention.

Near-supercritical liquids also demonstrate solubility characteristics and other pertinent properties similar to those of supercritical fluids. The solute may be a liquid at the supercritical temperatures, even though it is a solid at lower temperatures. In addition, it has been demonstrated that fluid "modifiers" can often alter supercritical fluid properties significantly, even in relatively low concentrations, greatly increasing solubility for some solutes. These variations are considered to be within the concept of a supercritical fluid as used in the context of this invention. Therefore, as used herein, the phrase supercritical fluid" denotes a compound above, at, or slightly below the critical temperature and pressure (the critical point) of that compound.

Examples of compounds which are known to have utility as supercritical fluids are given in Table 1.

TABLE 1
EXAMPLES OF SUPERCRITICAL SOLVENTS

| Compound | Boiling Point (°C.) | Critical Temperature (°C.) | Critical Pressure (atm) | Critical Density (g/cm³) |
|---|---|---|---|---|
| CO₂ | −78.5 | 31.3 | 72.9 | 0.448 |
| NH₃ | −33.35 | 132.4 | 112.5 | 0.235 |
| H₂O | 100.00 | 374.15 | 218.3 | 0.315 |
| N₂O | −88.56 | 36.5 | 71.7 | 0.45 |
| Xenon | −108.3 | 16.6 | 57.6 | 0.118 |
| Krypton | −153.2 | −63.8 | 54.3 | 0.091 |
| Methane | −164.00 | −82.1 | 45.8 | 0.2 |
| Ethane | −88.63 | 32.28 | 48.1 | 0.203 |
| Ethylene | −103.7 | 9.21 | 49.7 | 0.218 |
| Propane | −42.1 | 96.67 | 41.9 | 0.217 |
| Pentane | 36.1 | 196.6 | 33.3 | 0.232 |
| Methanol | 64.7 | 240.5 | 78.9 | 0.272 |
| Ethanol | 78.5 | 243.0 | 63.0 | 0.276 |
| Isopropanol | 82.5 | 235.3 | 47.0 | 0.273 |
| Isobutanol | 108.0 | 275.0 | 42.4 | 0.272 |
| Chlorotrifluoromethane | −31.2 | 28.0 | 38.7 | 0.579 |
| Monofluoromethane | −78.4 | 44.6 | 58.0 | 0.3 |
| Cyclohexanol | 155.65 | 356.0 | 38.0 | 0.273 |

Due to the low cost, environmental acceptability, non-flammability and low critical temperature of carbon dioxide, supercritical carbon dioxide fluid is preferably used with the coating formulations. For many of the same reasons, nitrous oxide ($N_2O$) is a desirable supercritical fluid for admixture with the coating formulations. However, any of the aforementioned supercritical fluids and mixtures thereof are to be considered as being applicable for use with the coating formulations.

The solvency of supercritical carbon dioxide is substantially similar to that of a lower aliphatic hydrocarbon and, as a result, one can consider supercritical carbon dioxide as a replacement for the hydrocarbon solvent of a conventional coating formulation. In addition to the environmental benefit of replacing hydrocarbon solvents with supercritical carbon dioxide there is a safety benefit also, because carbon dioxide is nonflammable.

Due to the solvency of the supercritical fluid with the coating formulations, a single phase liquid mixture is formed which is capable of being sprayed by airless spray techniques.

As discussed earlier the present invention is particularly applicable, although certainly not limited, to being able to prepare a heated and pressurized admixed liquid mixture of an accurately proportioned amount of supercritical fluid, particularly supercritical carbon dioxide, with a coating composition on a relatively small-scale, simple apparatus. As used herein, it will be understood that the phrase "precursor supercritical fluid" is a fluid such as carbon dioxide, nitrous oxide, and the like, which is not in the supercritical state but which, as a result of being processed in the apparatus of the present invention, will enter into such supercritical state, and additionally includes material which is already in the supercritical state.

The present invention is not narrowly critical to the type of coating composition that can be sprayed provided that there is less than about 30% by weight of water, preferably less than about 20% by weight of water, in the solvent fraction (as herein later defined) of the formulation. Thus, essentially any coating formulation meeting the aforementioned water limit requirement which is conventionally sprayed with an airless spray technique may also be sprayed by means of the methods and apparatus of the present invention. Such coating formulations are typically used for painting and finishing operations or for applying various adhesives compositions and the like.

Generally, such coating formulations typically include a solids fraction containing at least one component which is capable of forming a coating on a substrate, whether such component is an adhesive, a paint, lacquer, varnish, chemical agent, lubricant, protective oil, non-aqueous detergent, or the like. Typically, at least one component is a polymer component which is well known to those skilled in the coatings art.

Generally, the materials used in the solids fraction of the present invention, such as the polymers, must be able to withstand the temperatures and/or pressures which are involved when they are ultimately admixed with the at least one supercritical fluid. Such applicable polymers include thermoplastic or thermosetting materials or may be crosslinkable film forming systems.

In particular, the polymeric components include vinyl, acrylic, styrenic, and interpolymers of the base vinyl, acrylic, and styrenic monomers; polyesters, oil-free alkyds, alkyds, and the like; polyurethanes, oil-modified polyurethanes and thermoplastic urethanes systems; epoxy systems; phenolic systems; cellulosic esters such as acetate butyrate, acetate propionate, and nitrocellulose; amino resins such as urea formaldehyde, melamine formaldehyde; and other aminoplast polymers and resins materials; natural gums and resins; rubberbased adhesives including nitrile rubbers which are copolymers of unsaturated nitriles with dienes, styrene-butadiene rubbers, thermoplastic rubbers, neoprene or polychloroprene rubbers, and the like.

In addition to the polymeric compound that may be contained in the solids fraction, conventional additives which are typically utilized in coatings may also be used. For example, pigments, pigment extenders metallic flakes, fillers, drying agents, anti-foaming agents, antiskinning agents, wetting agents, ultraviolet absorbers, cross-linking agents, and mixtures thereof, may all be utilized in the coating formulation to be sprayed by the methods of the present invention.

In connection with the use of the various additives noted above, it is particularly desirable for pigments to be present in the coating formulation inasmuch as it has been found to aid in the release of the supercritical fluid from the sprayed composition resulting in improved atomization.

In addition to the solids fraction, a solvent fraction is also typically employed in the coating compositions whether they be an adhesive composition or a paint, lacquer, varnish, or the like, in order to act as a vehicle in which the solid fraction is transported from one medium to another. As used herein, the solvent fraction is comprised of essentially any active organic solvent and/or non-aqueous diluent which is at least partially miscible with the solids fraction so as to form either a solution, dispersion, or suspension. As used herein, an "active solvent" is a solvent in which the solids fraction is at least partially soluble. The selection of a particular solvent fraction for a given solids fraction in order to form a specific coating formulation for application by airless spray techniques is conventional and well known to those skilled in the art. In general, up to about 30% by weight of water, preferably up to about 20% by weight may also be present in the solvent fraction provided that a coupling solvent is also present in the formulation. All such solvent fractions are suitable in the present invention.

A coupling solvent is a solvent in which the polymeric compounds used in the solids fraction is at least partially soluble. Most importantly, however, such a coupling solvent is also at least partially miscible with water. Thus, the coupling solvent enables the miscibility of the solids fraction, the solvent fraction and the water to the extent that a single phase is desirably maintained such that the composition may optimally be sprayed and a good coating formed.

Coupling solvents are well known to those skilled in the art and any conventional coupling solvents which are able to meet the aforementioned characteristics, namely, those in which the polymeric components of the solid fraction is at least partially soluble and in which water is at least partially miscible are all suitable for being used in the present invention.

Applicable coupling solvents which may be used in the present invention include, but are not limited to, ethylene glycol ethers; propylene glycol ethers; chemical and physical combinations thereof; lactams; cyclic ureas; and the like.

Specific coupling solvents (which are listed in order of most effectiveness to least effectiveness) include butoxy ethanol, propoxy ethanol, hexoxy ethanol, isopropoxy 2-propanol, butoxy 2-propanol, propoxy 2-propanol, tertiary butoxy 2-propanol, ethoxy ethanol, butoxy ethoxy ethanol, propoxy ethoxy ethanol, hexoxy ethoxy ethanol, methoxy ethanol, methoxy 2-propanol, and ethoxy ethoxy ethanol. Also included are lactams such as n-methyl-2-pyrrolidone, and cyclic ureas such as dimethyl ethylene urea.

When water is not present in the coating formulation, a coupling solvent is not necessary, but may still be employed. Other solvents, particularly active solvents, which may be present in typical coating formulations and which may be utilized in the present invention include ketones such as acetone, methyl ethyl ketone, methyl isobutyl ketone, mesityl oxide, methyl amyl ketone, cyclohexanone and other aliphatic ketones; esters such as methyl acetate, ethyl acetate, alkyl carboxylic esters; ethers such as methyl t-butyl ether, dibutyl ether, methyl phenyl ether and other aliphatic or alkyl aromatic ethers; glycol ethers such as ethoxy ethanol, butoxy ethanoyl, ethoxy 2-propanol, propoxy ethanol, butoxy 2-propanol and other glycol ethers; glycol ether esters such as butoxy ethoxy acetate, ethyl 3-ethoxy propionate and other glycol ether esters; alcohols such as methanol, ethanol, propanol, iso-propanol, butanol, iso-butanol, amyl alcohol and other aliphatic alcohols; aromatic hydrocarbons such as toluene, xylene, and other aromatics or mixtures of aromatic solvents; aliphatic hydrocarbons such as VM&P naphtha and mineral spirits, and other aliphatics or mixtures of aliphatics; nitro alkanes such as 2-nitropropane. A review of the structural relationships important to the choice of solvent or solvent blend is given by Dileep et al., *Ind. Eng. Che.* (Product REsearch and Development) 24, 162, 1,985 and Francis, A. W., *J. Phys. Chem.* 58, 1,099, 1,954.

Of course, there are solvents which can function both as coupling solvents as well as active solvents and the one solvent may be used to accomplish both purposes. Such solvents include, for example, butoxy ethanol, propoxy ethanol and propoxy 2-propanol. Glycol ethers are particularly preferred.

Suitable additives that are conventionally present in coating formulations that are intended for spray application may also be present in this invention, such as, curing agents, plasticizers, surfactants, and the like.

Figure 2:
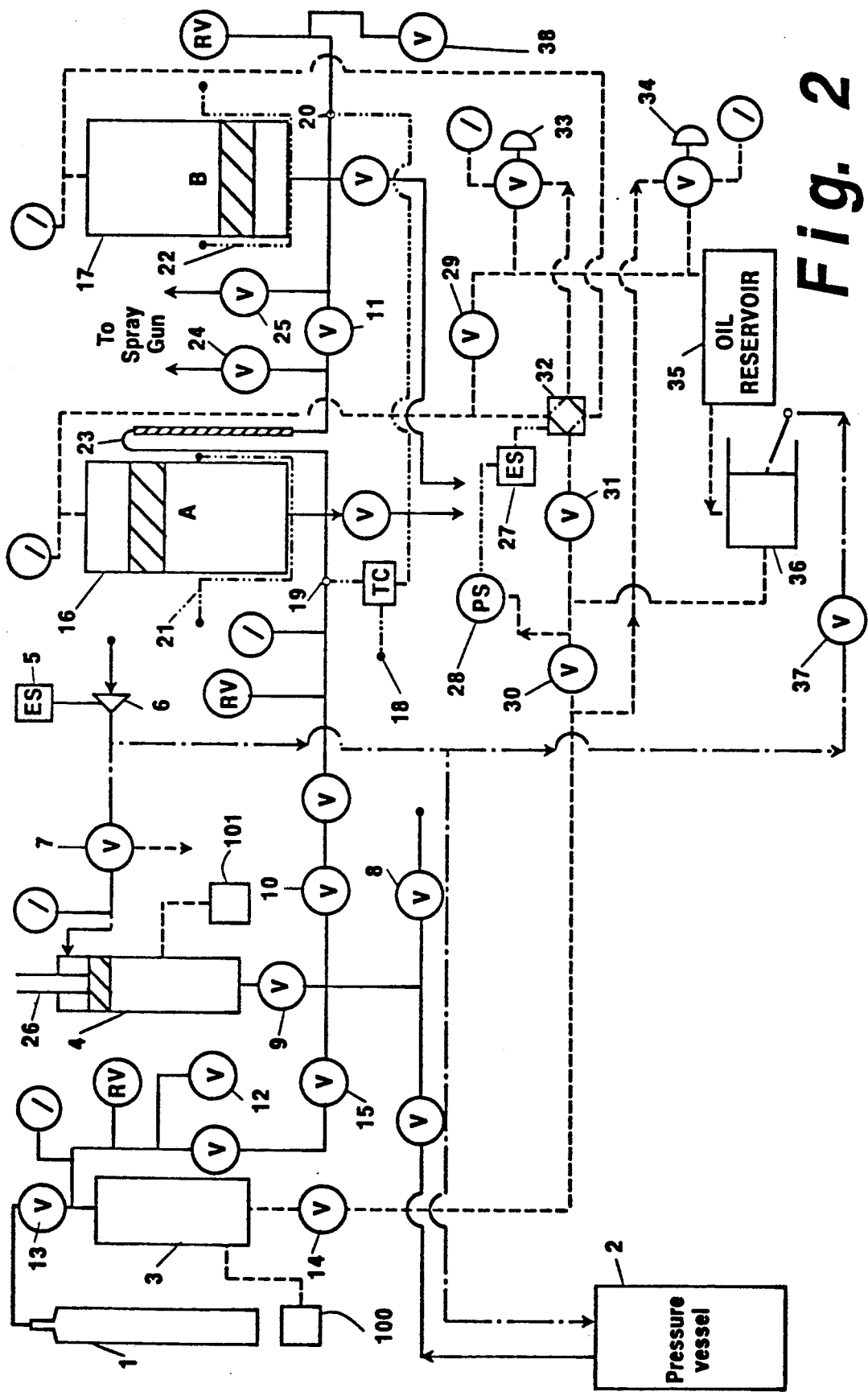
FIG. 2 is a schematic diagram of the present invention showing the basic elements in which an accurately proportioned mixture of supercritical carbon dioxide and coating formulation are prepared in preparation for spraying.

Referring now to FIG. 2, an apparatus is shown which is capable of pressurizing, metering, proportioning, heating and mixing a coating composition with carbon dioxide to form an admixed liquid mixture comprising the coating composition and supercritical carbon dioxide which is present in essentially precisely desired proportions and ready for being sprayed. As noted above, while this discussion is specifically focused on carbon dioxide and coating formulation, the present invention is in no way limited to these materials. Any admixture of fluids may be prepared with the apparatus and methods of the present invention, although the present invention is particularly applicable for admixing, heating and pressurizing a mixture of compressible and non-compressible fluids. When preparing a coating formulation using a supercritical fluid, which is featured in the present invention as one of its more preferred embodiments, any fluid capable of entering its supercritical state such as the ones set forth in Table 1, which are suitable for the particular application desired, may also be utilized.

In particular, the precursor supercritical fluid, such as carbon dioxide, is supplied as a liquid from any suitable source, such as a tank or cylinder 1. Preferably, the liquid carbon dioxide is supplied on a semi-continuous batch basis from whatever source is utilized. The liquid carbon dioxide, at its vapor pressure at room temperature (approximately 800–850 psig) is introduced into a primary vessel, such as accumulator 3. Similarly, coating formulation is supplied from any suitable source such as a pressure vessel or pot 2. The coating formulation is also supplied on a batch basis from whatever source is utilized. The coating formulation material, at room temperature, is measured as it is introduced into another primary vessel, such as accumulator 4. Both of the primary vessels are equipped with some means of removing at least a portion of their respective contents and introducing them to secondary vessels within the oscillation mixing loop, which will be further discussed below. In a preferred embodiment, the fluids are removed from the primary vessels by the displacement of all or a portion of such fluids by the use of a piston located within the primary vessel having appropriately effective sealing means and which is capable of reciprocally traversing the length of the vessel, such as is conventionally found in an accumulator. As will be discussed below, the displacement of the piston displacement means, can be utilized to determine the amount of fluid leaving a primary vessel thereby facilitating the proper proportionating of the required admixture.

While the embodiment shown in FIG. 2 depicts the use of only two primary vessels for receiving each of the fluids, respectively, it is understood that yet additional primary vessels may be utilized for any additional fluids that may be desired, generally one fluid per vessel. Of course, any one fluid may be comprised of a mixture of constituents and the present invention has within its scope such a possibility.

Both of these liquids, the coating composition and the precursor supercritical fluid, are then introduced into secondary vessels within the oscillation mixing loop, desirably accumulators 16 and 17, while determining the mass of fluid leaving the primary vessels such that the proper proportioned amount of fluids is introduced into the secondary vessels. The oscillating loop, comprised of the two secondary accumulators 16 and 17, and desirably a static mixer 23 is then pressurized and the fluid materials are mixed and heated by oscillation between the secondary accumulators, going through static mixer 23, until the desired degree of heating and pressurization is obtained, such as when the precursor supercritical fluid enters the supercritical stage. Complete mixing is obtained and thermodynamic equilibrium is achieved, when a single phase is established, except when insoluble solids, such as pigments, metallic flakes, fillers, and the like, are present. Heating of the fluids within the oscillation loop is accomplished by any convenient means. Such means may include heat exchangers positioned in the oscillation loop. Desirably, this heating means may be positioned directly on or in the secondary vessels, such as a steam jacket or may alternatively comprise one or more electrically heated elements 21 which are provided on the secondary accumulator vessels. Pressurization of the fluid mixture may also be provided by any conventional means which is well known to those skilled in the art. By the use of accumulators, such pressurization may be provided by simply regulating the back pressure on the pistons which displace the contents of the accumulator, which pressurization method is preferred.

Here again, although only two secondary vessels are shown in FIG. 2, it is to be understood that any number of such vessels may be utilized. However, the use of more than two vessels does not significantly improve the results that are obtained.

Oscillation between the secondary accumulators 16 and 17 and static mixer 23 is provided by any conventional power source such as air driven hydraulic pump 36 which is used to pressurize the hydraulic liquid, supplied from reservoir 35, which drives the pistons "A" and "B" in accumulators 16 and 17, respectively. Other conventional power sources well known in the art, such as compressed air, electromechanical drives, and the like, may also be utilized. Alternatively, the fluids may be oscillated between the secondary vessels by other conventional means, such as by commercially available pumping means located within the oscillation loop.

Cycle flow direction reversal and control within the oscillation mixing, heating and pressurization loop is effected by back pressure regulator 33, pressure switch 28, and four way valve 32, which desirably is a four way solenoid valve, in the hydraulic fluid system. The pressure switch 28 activates when the pressure in one of the accumulators exceeds the system back pressure set by pressure regulator 33 when its piston substantially reaches the end of its traverse; such activation causes the four way solenoid valve 32 to operate, causing the desired flow reversal. In this manner, the displacement of the fluids from one of the secondary vessels to the other is desirably synchronized so that at the moment the fluids from one secondary vessel ceases to be displaced and introduced into another secondary vessel, the flow is reversed and the vessel formerly receiving the fluids now is in the mode of having the fluids removed therefrom and vice versa. Desirably, the oscillation is controlled such that the displacement means within the accumulators, e.g., the pistons, traverse the entire length of the accumulator such that substatially the entire contents of the accumulator is removed and transferred to the other accumulator thereby assuring adequate mixing.

The method and apparatus of the present invention, as shown symbolically and schematically in FIG. 2, will now be addressed more precisely. Preferably, all rigid connections are made with commercially available seamless, welded, type 304 stainless steel hydraulic tubing ASTM A-269 with 5,000-psi pressure rating, using Swagelok fittings, or equivalent. Flexible connections are made with commercially available high-pressure hose such as Graco static-free nylon hose model #061-221 with 3,000 psig pressure rating or Graco static-free nylon highpressure hose model #061-214 with 5,000 psig pressure rating.

The commercially obtainable carbon dioxide pressure cylinder 1 is connected to accumulator 3 which may be a Tobul Accumulator model 3AT30-1 available commercially from Tobul Accumulators Division of Mill and Mine Services, Inc. The coating formulation pressure vessel 2, typically a commercially obtainable agitated low-pressure vessel, such as that available, for example, from Binks Manufacturing Company, Model 83-5508, is connected to accumulator 4, such as a Tobul Accumulator Model 3AT30-2. Accumulator 4 may be modified by connecting a piston rod 26, by suitable means, to the face of its piston. Rod 26 extends through the gas end cap of accumulator 4 and is sealed by a suitable packing device. Piston rod 26 is marked with a scale which is calibrated to the volume of accumulator 4 to allow for the determination of the amount of coating formulation present in the cylinder and to monitor the amount of material displaced therefrom. The gas end cap of accumulator 4 is preferably further modified to provide a fitting to connect compressed air supplied by any convenient source through electrical emergency shutdown switch 5, connected to the compressed air header valve, and three-way valve 7, such as Whitey Company's model SS-43XF4. The compressed air supply is also connected to pressure pot 2 and hydraulic pump 36, which is any suitable oil pump, such as commercially available Haskel, Inc. Model MLP-46 single-stroke reciprocating pump.

The piston of accumulator 3 is driven by hydraulic oil pumped by pump 36 from oil reservoir 35 through valves 14 and 30 in the line connecting accumulator 3 and pump 36. Back pressure regulator 34 is interconnected to the hydraulic oil system in the return path of the oil from accumulator 3 to oil reservoir 35 to provide for pressure regulation and relief.

primary accumulators 3 and 4 are connected by suitable lines and valves 9, 10, 11 and 15 to the oscillation mixing loop and spray gun material supply accumulators 16 and 17. Any commercially available accumulators, such as Tobul Accumulators, Model 4.7A30-4, are suitable. Secondary accumulators 16 and 17 are interconnected by a line that includes static mixer 23, such as commercially available Kenics type fluid static mixer model 37-06-110. This line provides, through suitable fittings and valves 11, 24 and 25, the thoroughly admixed supercritical fluid coating composition mixture to and from the spray gun, which may be any commercially available airless and/or air-assisted airless spraying device, and may be operated with or without circulation depending upon the type of spraying apparatus chosen.

pistons "A" and "B" in accumulators 16 and 17 are driven by hydraulic oil that is supplied by by pump 36 through lines containing valves 29, 30 and 31. Also located in this part of the hydraulic oil system is back pressure regulator 33, such as commercially available Binks Manufacturing Company Model 84-421, to provide pressure regulation and relief, and pressure switch 28, such as is commercially available as SOR, Inc. Static O-Ring Pressure Switch, to activate four way solenoid valve 12, which may be any commercially available solenoid valve, such as Vickers Inc., Model DG4V-3-2A-M-W-B-40. This valve provides for reverse switching of the flow of the hydraulic oil to accumulators 16 and 17. Pressure switch 28 and four way valve 32 are linked by emergency shutdown device 27 to provide additional overpressure protection of the apparatus.

In lieu of using a pressure regulator switch and a four way solenoid valve, other pressure sensing devices, switching devices for changing the direction of flow of the fluids within the oscillation loop, which are well known to those skilled in the art, are also suitable for use in the present invention. For example, a pressure transducer may be used to detect the pressure level in the vessels and send a signal to a signal processor. Such signal processor may, in turn, provide an electrical signal to operate two 3-cycle valves or, alternatively, four on/off falves which may be adapted to appropriately control and reverse the direction of fluid flow within the oscillation loop.

Heaters 21 and 22 are mounted on the periphery of accumulators 16 and 17 to provide for the heating of the fluids, as they are mixed, to the operating temperature and maintain said temperature during the spraying operation. Any standard type heater may be used such that efficient thermal energy transfer to the fluids is attained. Most preferred are types, such as the band type heater or cable type heater, which are commercially available from suppliers such as Watlow Electric Manufacturing Company. Other heating means such as conventional steam jackets may also be utilized. The oscillation loop temperature is monitored by thermocouples 19 and 20 which operate in conjunction with temperature control system 18. The said temperature control system and thermocouples may be selected from standard commercially available methods and apparatus and are not critical to the scope of the present invention. Pressure relief valves, as shown, which discharge to the environment, are provided in each process loop to protect the apparatus against overpressurization.

FIG. 2 also shows strategically placed pressure indicators, drain valves and sample valves.

In operation of the present invention there are three distinct phases: the feed phase; the oscillation phase for mixing and heating; and the spraying phase.

In the feed phase, the desired supercritical fluid to coating composition mass ratio is achieved by adjusting and controlling the amount of coating formulation fed from the primary vessel, such as accumulator 4, by using the volume indicator rod 26 or any other suitable mass measuring means. Thus, by knowing the volume of the fluid displaced as well as the density of the particular fluid, it is a simple matter to derive the actual mass that is being fed to the oscillation loop.

Since the mass of carbon dioxide is fixed by the volume of carbon dioxide in accumulator 3 and the temperature and pressure therein, it becomes a constant in the ratio equation for the specific piece of apparatus furnished to the process Any change in pressure and/or temperature in the vessel containing the compressible fluid may easily be taken into account by the utilization of the standard and well known gas laws.

Although not required, it is generally desirable, in a preferred embodiment of the present invention, to transfer essentially the entire contents of the accumulator containing the compressible fluid such that the volume, at a known temperature and pressure, is readily known. Thus, the accumulator housing the compressible fluid may also be equipped with a piston rod 26 which is calibrated to the volume of the accumulator. In this manner, the displaced volume is readily known and the mass of compressible fluid may be simply derived. In yet another alternative embodiment of the present invention, load cells 100 and 101 may be utilized with the primary vessels such that the amount of mass leaving one or more of the accumulators may be directly measured Other commercially available and suitable mass measuring devices may also be used.

To commence operation, switch 5 is energized thereby opening the header air line valve 6 that provides compressed air to pressure pot 2, which has been prefilled with coating formulation; the pressure at pressure pot 2 being regulated to between 60 and 80 psig. Agitation of the contents of pressure pot 2 is then initiated by activating the agitator drive, which is not shown. Drain valve 8 is opened and flow of coating formulation from pressure pot 2 is initiated allowing the bleeding of air from the feed line. Once coating formulation flows freely from drain valve 8, it is closed and valve 9 is opened along with three way valve 7, which is positioned to vent air from accumulator 4, thereby allowing coating formulation to flow into accumulator 4. When accumulator 4 is full, as indicated by the calibration on measuring rod 26, valve 9 is closed and valve 7 is turned to the air supply position and the air pressure on accumulator 4 is set to about 80 psig.

Carbon dioxide accumulator 3 is then charged from cylinder 1 by first opening valve 14 and back pressure regulator 34, and then opening valve 13. Accumulator 3 is desirably a calibrated vessel that will contain a predetermined exact amount of liquid carbon dioxide when its piston is at the limiting extent of its traverse. This is confirmed when a rapidly vaporizing liquid and/or ice spray is detected when valve 12 is cracked open. At this point, the pressure in accumulator 3, as indicated on the gauge, should be at the cylinder 1 pressure of about 800–850 psig. Valve 13, valve 14, as well as back pressure regulator 34, are then closed.

While the above discussion indicated that the coating formulation, i.e., the non-compressible fluid was introduced into the primary vessels first, then followed by the introduction of the liquid carbon dioxide, i.e., the compressible fluid, it is to be understood that the order of introduction into the primary vessels is not critical to the present invention, and either fluid may be introduced first.

At this point, both fluids have been introduced into calibrated primary vessels 3 and 4, which supply the fluids, in a predetermined proportion, to the secondary vessels contained in the oscillation mixing, heating and pressurizing loop. The next step is the transfer of coating formulation and carbon dioxide in the substantially desired mass ratio to provide the desired coating admixture for the specific spraying application.

In the preferred embodiment of the present invention, the coating formulation is first supplied to the oscillation mixing loop. In this manner, one of the benefits of the invention is realized, i.e., simplicity with a minimum of equipment required, inasmuch as low pressure compressed air can be used to fill the system when it is at room temperature and atmospheric pressure and, therefore, a high pressure pump and ancillary equipment is not needed as is the case if the carbon dioxide were to be charged first, which may also be done.

To charge the coating formulation to the oscillation mixing loop, valves 9, 10, and 11 are opened, thereby filling accumulators 16, 17 and the process lines with the desired coating formulation volume as indicated by the scale on indicator rod 26. Once the transfer is effected, valves 9 and 10 are closed and the pressure is bled from accumulator 4 by repositioning valve 7 to the vent position.

To charge the precursor supercritical fluid, first the hydraulic system is started by opening valve 37 with regulation of the pressure at about 40 psig. Then valves 10 and 15 are opened to allow the loop to fill slowly until flow ceases. At this point, valve 10 is closed. The residual carbon dioxide in accumulator 3 is then bled off by opening drain valves 8 and 12, and then pressure in the hydraulic system is bled off by opening back pressure regulator 34. Finally, valve 30 is closed and then valves 8, 12 and 15 are closed. Generally, only the equivalent of one accumulator volume, for example, accumulator 16, is in the oscillating loop system.

The second stage of pressurization, heating and mixing is now initiated by opening valves 29 and 31 to start the hydraulic oil into the hydraulic side of the oscillation loop. Once the system is filled with oil, valve 29 is closed. The pressure of the system is then set to the desired level by adjusting back pressure regulator 34. For obtaining supercritical carbon dioxide, the pressure is usually set to be within the operating range of 1,200 to 1,800 psig. When accumulators are not utilized, the desired pressure within the oscillation loop may also be provided by conventional reciprocating pumps, for example, positioned in the loop and powered by any conventional power source.

Heaters 21 and 22 are next energized and the two fluids that have been charged to the system are heated and mixed through static mixer 23 as oscillation occurs between accumulators 16 and 17.

Oscillation is accomplished by interaction between a pressure sensing device, which measures the pressure in the secondary vessels, such as pressure switch 28 which generates a signal in response to such pressure measurement, and a switching means which is responsive to the generated signal, such as four way valve 32. Other pressure sensing devices and switching means are also suitable for use in the present invention.

As an example, as hydraulic fluid pressure is exerted on the face of piston "A" in accumulator 16 causing it to traverse downwardly thereby forcing the admixed coating formulation out of the accumulator through static mixer 23 and valve 11, the displaced admixture is then simultaneously introduced to accumulator 17 wherein piston "B" begins its traverse upwardly in a direction away from the end of the accumulator at which the admixture is being introduced, which in turn causes hydraulic fluid to flow through the process lines and solenoid 32 and back pressure regulator 33 to oil reservoir 35, thereby closing the hydraulic loop; e.g., from the pump through the system to the reservoir and back to the pump. When piston "A" reaches the end of its travel path, pressure on the hydraulic system reaches the limit as set on pressure switch 28, which in turn activates solenoid 32, causing the switch to change to its second position, whereby hydraulic pressure is now brought to bear to the face of piston "B" in accumulator 17. This then forces the piston to traverse in the opposite direction, which, in turn, causes the admixed coating formulation to reverse its direction in the oscillating loop, and as a direct result, causes piston "A" to now reverse its traverse, in synchronization with the motion of piston "B", with hydraulic fluid now returning to oil reservoir 35 via the process lines and pressure regulator 33.

When the oscillating loop temperature reaches the desired value, usually in the range of about 55° to 60° centigrade in the case of obtaining supercritical carbon dioxide, as indicated by thermocouples 19 and 20, and the coating formulation and carbon dioxide fluids are admixed—it generally takes only a few passes through the loop, usually ten to fifteen passes, to attain this state—then, the process is ready for the final stage of applying the admixed coating formulation to the substrate.

With the unit now ready for the final operation, wherein the temperature and pressure are within the desired ranges, normally about 55° to about 60° centigrade and about 1,200 to about 1,800 psig, respectively, for a coating formulation containing supercritical carbon dioxide, valve 11 is closed and spray gun (not shown) feed and return valves 24 and 25 are opened. At this stage the system back pressure is positioned at the desired set point by adjusting pressure regulator 33. With subsequent activation of the spray gun, admixed coating formulation is pressure sprayed through the gun onto the substance to be coated with, in this case, recirculation of admixed coating formulation to the oscillating loop. Alternately, with valve 11 opened and either of valves 24 or 25 closed, single-pass flow through the spray gun occurs. During operation in either mode, both accumulators 16 and 17 contain admixed coating formulation, albeit in ever reduced amounts, with said admixture oscillating between the accumulators thereby maintaining the desired thermal level as well as the degree of desired pressurization with continued suspension of any insoluble components, such as pigments and the like, with mixer 23 providing for homogeneity of the coating admixture.

Should it be desirable, the apparatus may be refilled with the same coating formulation to continue spraying application once the single batch coating admixture has been depleted. To accomplish this, once the spray gun has been deactivated, valve 11 is opened and valves 24 and 25 are closed. The oscillating loop pressure is then reduced by opening pressure regulator 33 and adjusting heaters 21 and 22 to their lowest setting. Controller 18 is then turned off. When the temperature, as monitored by thermocouples 19 and 20, has decreased to below 40° C., valves 31 and 37 are closed. Recharging the apparatus with the coating formulation and carbon dioxide is accomplished by repeating the steps as enumerated earlier in the feed phase. The oscillation phase is then accomplished as earlier described and once achieved, spraying can then begin again.

The apparatus can accept another coating formulation, say one containing a pigment of different color, with a minimum of downtime. Essentially, the unit is shut down by shutting off the heaters and deactivating the hydraulic system after as much of the present coating admixture as possible has been discharged through valve 38 into a suitable waste container. The coating formulation feed system, which contains accumulator 4, is then cleaned by replacing pot 2 with a pot containing an appropriate solvent and introducing said solvent into this part of the apparatus by manipulating the proper valves and the hydraulic system such that this part of the apparatus becomes free of coating formulation, as indicated by the clean state of the fluid observed as it drains through valve 8 into a suitable waste material container. Thereafter, solvent is admitted to the oscillation loop with draining of an equivalent amount of coating admixture, as purge material, through drain 38 to a suitable waste container.

At this point, since it is desirable to minimize the environmental impact associated with using organic solvents, subcritical liquid carbon dioxide may be pressure transferred from accumulator 3, after it has been suitably charged from cylinder 1, into the oscillation circulating and spraying loop. There, it passes through the process lines and appropriate valves 15, 10, 24, 25, and 11, discharging through drain valve 38 into a suitable waste material container, thereby purging the apparatus of the majority of the coating fluid contained therein.

In essense, the carbon dioxide, acting as a slug of fluid, pushes the coating admixture from the apparatus. With the process operating in a state of plug flow, with the solvent acting as a buffer between the carbon dioxide and the coating admixture, the desirable single phase state is maintained thereby minimizing and/or averting the adhering of difficult to remove coating material on the walls of the apparatus. Following this step, solvent from pressure vessel 2 is transferred into the circulating loop via the appropriate lines and valves to fill the loop, at which time activation of the hydraulic system causes the oscillation of the solvent throughout the loop apparatus. Oscillation is continued for a nominal time, preferably about 15 minutes, after which time the solvent is pressure sprayed through the spray gun, thereby cleaning it, and then discharged through drain valve 38 into a waste container.

More than one solvent flush may be necessary to completely remove the last traces of the coating material. To conserve solvent even further, a mixture of carbon dioxide and solvent may be transferred to the oscillation loop rather than pure solvent for the final flushes. Once completed, the apparatus is allowed to freely drain to the waste container and then, if necessary, is air purged with filtered compressed air for at least about 30 minutes to remove any remaining traces of the solvent. The new batch of coating concentrate can now be introduced into the apparatus following this cleaning procedure.

Accordingly, a coating color change, for example, can be accomplished with a minimum of downtime, thereby minimizing operating costs, and allowing a minimum of organic materials to escape into the environment as pollutants, which is one of the objectives of the present invention. In a like manner, the apparatus can be cleaned for final shutdown with minimal environmental impact. Of course, by the use of conventional accumulators in the fashion discussed, a simple and efficient system is provided which can readily be transportable and which is particularly utilizable by small end users for various applications.

The following examples are provided to further illustrate the invention. These examples are intended to be illustrative in nature and are not to be construed as limiting the scope of the invention.

EXAMPLE 1

The following Example illustrates the practice of the present process in a batch mode. The apparatus is assembled according to the schematic diagram shown in FIG. 2. Using the apparatus, compressible carbon dioxide and non-compressible coating formulation are accurately proportioned and processed to form an admixed liquid mixture that contains the proper concentration of carbon dioxide for spray application of the coating formulation onto a substrate. Agitated non-compressible coating formulation (described below) is pressurized from an agitator equipped two and one-half gallon pressure pot 2 (Binks Model 83-5508 with a MAWP of 110 psig) ("MAWP" is defined as "maximum allowable working pressure"), which was pressurized to 60 psig with air, to coating accumulator 4 (Tobul Model 3AT30-2 with a nominal capacity of one-quart and a MAWP of 3,000 psig, which had been modified to accommodate indicator rod 26) until it was full. Based on the predetermined ratio of coating formulation to carbon dioxide, 813 grams of coating formulation is pressurized into the circulation oscillating loop from accumulator 4 by air pressurized to 80 psig, wherein the precalibrated scaled indicator rod 26 on accumulator 4 was used to monitor when the correct amount of 813 grams has been charged. Compressible precursor liquid carbon dioxide was drawn from a Linde size K cylinder 1 through an educator tube at room temperature and a pressure of about 830 psig into accumulator 3 (Tobul Model 3AT30-1 that has a nominal capacity of one-pint and a MAWP of 3,000 psig), which had been precalibrated at standard conditions of 21° C. and 830 psig to contain at, said conditions, 477 grams of liquid carbon dioxide when full. At this point, accumulator 3 was at a room temperature of 22° C. and a pressure of 852 psig. Carbon dioxide is then transferred to the oscillation loop, which was still at "low-pressure", by activating the hydraulic oil pump 36 (Haskel Model MLP-46, with a MAWP of 2,600 psig) and the switching control system, containing pressure switch 28 (SOR static o-ring pressure switch) and four way solenoid valve 32 (Vickers model DG4V-3-2A-M-W-B-40, with a MAWP of 3,000 psig), by providing air regulated at 70 psig to oil pump 36 and setting the pressure on accumulator 3 at 1,700 psig by adjusting back pressure regulator 34 (Binks Model 84-421, with a MAWP of 3,000 psig).

Once all of the carbon dioxide is charged to the oscillation loop, the pressure on pressure regulator 34 is reduced to atmospheric pressure, and the hydraulic system for the primary vessels is isolated by closing valve 30.

The oscillation loop system containing accumulators 16 and 17 (Tobul Model 4.7A30-4 with a nominal capacity of one-half gallon and a MAWP of 3,000 psig), which had been modified by the addition of electrically energized Glas-Col heating mantle surface heaters to their perimeters, and static mixer 23 (Kenics Model 37-06-110, with a MAWP of 2,196 psig) now contain a total of 1,283 grams of coating formulation and carbon dioxide accurately proportioned to a coating formulation to carbon dioxide ratio of 63.3 to 36.7, on a weight percent basis.

The coating formulation and carbon dioxide are then mixed in the oscillation loop to produce an admixed coating formulation. The oscillation loop hydraulic system is started after the pressure level of the loop is set at 1,650 psig by adjusting back pressure regulator 33 (Binks Model 84-421, with a MWAP of 3,000 psig). With the heater controls set to heat the admixture and to maintain it at 60° C., oscillation between accumulator 16 and accumulator 17, going through static mixer 23, is initiated. About 20 passes or oscillations between accumulators 16 and 17 are necessary to achieve complete homogeneity of the coating formulation and to reach oscillation loop thermal equilibrium; that is, 58° C., with pressure in the loop regulated at an indicated level of 1,650 psig.

With the unit now ready with oscillation of the coating formulation continuing between the secondary accumulators 16 and 17, spraying is initiated by pulling the trigger on the spray gun (Nordson Model A4B airless hand gun). During spraying at a pressure of about 1,640 psig (a 10 to 15 psig pressure drop occurs when the gun is spraying), the oscillation loop temperature averages about 58° C. and the spray gun temperature averages about 50° C. In this manner, several metal panels are coated with the coating formulation while using three different orifice size spray tips in the gun (Binks 9-0750, 9-0940 and 9-1170). In all cases, good spraying is observed with no fingering, thereby resulting in good coatings.

The non-compressible coating formulation used is a clear acrylic coating formulation prepared from Rohm & Haas Acryloid AT-400 resin, Rohm & Haas Acryloid AT-954 resin, which contains 80% non-volatile acrylic polymer dissolved in 20% methyl amyl ketone solvent, Cymel 323 resin dissolved in isobutanol, by mixing the resins with the solvents n-butanol, ethyl 3-ethoxypropionate (EEP), methyl amyl ketone, and Union Carbide silicone surfactant L5310 dissolved in xylene in the following proportions:

| | |
|---|---|
| Acryloid AT-400 | 6,520.5 grams |
| Acryloid AT-954 | 1,917.8 grams |
| Cymel 323 | 2,718.0 grams |
| n-butanol | 626.0 grams |
| EEP | 889.0 grams |
| methyl amyl ketone | 320.0 grams |
| 50% L5310 in xylene | 39.0 grams |
| Total | 13,030.3 grams |

The coating formulation contains 66.88% solids fraction and 33.12% solvent fraction, with the following component composition:

| | |
|---|---|
| AT-400 polymer | 4,890.4 grams |
| AT-954 polymer | 1,630.1 grams |
| Cymel 323 polymer | 2,174.4 grams |
| isobutanol | 543.5 grams |
| n-butanol | 626.0 grams |
| EEP | 889.0 grams |
| methyl amyl ketone | 2,237.8 grams |
| xylene | 19.5 grams |
| L5310 | 19.5 grams |
| Total | 13,030.2 grams |

EXAMPLE 2

In this example, the same coating formulation, apparatus and, procedure are used as in Example 1, with the exception that heaters 21 and 22 on accumulators 16 and 17 are replaced, to improve the rate of reaching thermal equilibrium during the oscillation phase and ultimately the desired spraying temperature, with Lab Glass Inc. Model DET-10 heating tapes, with an Omega Engineering, Inc. Model CN9122 Microprocessor Temperature Controller with Omega model SSR 240D10 solid state relays. Additionally, a heating tape is applied around the perimeter of the Kenics mixer 23 nominally extending onto the piping from both ends of the mixer to accumulators 16 and 17. In addition, the spray gun is changed to an automatic airless circulating spray gun (Nordson Model A7A Automatic Airless Spray Gun) mounted on a Spraymation automatic sprayer, which is a transversing apparatus that allows controlled adjustable horizontal motion of the gun. Unlike the gun used in Example 1, this gun is remotely located in a spray booth that necessitates using a 22.5 foot gun hose that was unheated, but insulated. The new heaters were seen to be more effective despite the greater heat losses caused by the longer length of spray gun hose.

Agitated non-compressible coating formulation (the same as used in Example 1) is pressurized from an agitator equipped two and one half gallon pressure pot 2, which is pressurized to 60 psig with air, to coating accumulator 4, which has been modified to accommodate indicator rod 26 until it was full. Based on the designated ratio of coating formulation to carbon dioxide, 709.7 grams of coating formulation is displacedd into the circulation oscillating loop from accumulator 4 by air pressurized to 80 psig, wherein the precalibrated scaled indicator rod on accumulator 4 is used to monitor the amount charged and determine when the correct amount of 709.7 grams had been charged. Compressible precursor liquid carbon dioxide was drawn from a Linde size K cylinder 1 through an educator tube at room temperature and a pressure of about 830 psig into accumulator 3, which had been precalibrated at standard conditions of 21° C. and 830 psig to contain, at said conditions, 477 grams of liquid carbon dioxide when full. At this point, accumulator 3 is at a room temperature of about 20° C. and a pressure of 813 psig. Carbon dioxide is then transferred to the oscillation loop, which is still at "low-pressure", by activating the hydraulic oil pump 36 and the system containing pressure switch 28 and four way solenoid valve 32, by providing air regulated at 70 psig to oil pump 36 and setting the pressure on accumulator 3 at 1,600 psig by adjusting back pressure regulator 34. Once all of the carbon dioxide is charged to the loop, the pressure on pressure regulator 34 is reduced to atmospheric pressure, and the hydraulic system on the primary vessels is isolated by closing valve 30. The oscillation loop system containing the heating tape modified accumulators 16 and 17, and heating tape modified static mixer 23, now contains a total of 1,179.7 grams of coating formulation and carbon dioxide accurately proportioned to a coating formulation to carbon dioxide ratio of 60.16 to 39.84, on a weight percent basis.

The coating formulation and carbon dioxide are then mixed in the circulating oscillation loop to produce an admixed coating formulation. The oscillation loop hydraulic system is started after the pressure level of the loop is set at 1,550 psig by adjusting back pressure regulator 33. With the heater controls set to heat the admixture to a temperature of 60° C. and maintain it at that temperature, oscillation between accumulators 16 and 17, going through mixer 23, is initiated.

Within about 20 minutes, the oscillation loop temperature averages about 50° C. with a spray gun temperature of about 39° C. As heating and mixing continues, about 40 minutes are required to regulate the heaters to achieve a match of the temperatures in acccumulators 16 and 17 and to bring the gun temperature level up to about 50° C. This time period is due to the learning curve associated with the initial use of the heating tapes and the long hoses. However, it takes only about the first 10 cycles at about 1.29 minutes per cycle, or about 13 minutes in total, to achieve complete mixing of the coating formulation and the supercritical carbon dioxide. When thermal equilibrium is reached, the oscillation loop temperature is about 60° C., the gun temperature is about 51° C., and the loop pressure is about 1,550 psig.

With the unit now ready, with oscillation of the admixed coating formulation continuing between accumulators 16 and 17, spraying is initiated with the gun traversing at a rate of 300 inches per minute (IPM) with a Binks 9-0750 orifice tip in the gun. During spraying of several metal panels, the loop pressure is about 1,535 psig (a 10 to 15 psig pressure drop occurs when the gun is spraying), the loop temperature averages about 60° C., and the spray gun temperature averages about 50° C.

All of the metal panels sprayed are baked at 250° F. for one hour. During spraying of all of the panels a good spray pattern with no fingering is observed. With the initial panel, the results show cratering and dryness due to a too slow traverse speed. The spray gun orifice size is increased by using a Binks 9-0970 tip, and the gun traverse speed is raised incrementally to 408, and eventually 450 IPM, which results in good coatings. However, some dust from the atmosphere has settled on the panels marring their finish somewhat.

Finally, the orifice size is again increased by using a Binks 9-1140 tip. With a gun traverse speed of 450 and 500 IPM, sagging is observed. With an increase of the traverse speed to 550 IPM, however, the sagging disappears resulting in coated panels that meet all criteria.

What is claimed is:

1. An apparatus for forming a heated and pressurized mixture of two or more fluids in a predetermined proportion which comprises:
   a) means for supplying two or more fluids to two or more primary vessels, one fluid being supplied to one primary vessel, respectively, each primary vessel having a known volume at a predetermined pressure and temperature;
   b) means for removing at least a portion of each of the fluids from each of the respective primary vessels;
   c) means present on at least one or more of the primary vessels for measuring the mass of a fluid leaving said at least one or more primary vessels;
   d) at least two or more secondary vessels capable of being pressurized for receiving the fluids leaving the primary vessels;
   e) means communicating between said secondary vessels for conveying the fluids from one or more of the secondary vessels to one or more of the other of said secondary vessels;
   f) means for continuously oscillating the fluids through the communicating means from at least one of said secondary vessels to at least one of the other of said secondary vessels, where said oscillation of the fluids provides for their mixing;
   g) means for pressurizing the fluids as they are being oscillated between the secondary vessels; and
   h) means for heating the fluids as they are being oscillated between the secondary vessels.

2. The apparatus of claim 1, wherein the at least two or more primary vessels, each having walls and an upper and lower end, contain a reciprocating displacement means for displacing and thereby removing fluid contained in said vessels.

3. The apparatus of claim 2, wherein the displacement means comprises a piston with suitable sealing means having a front face and a back face; the front face facing the lower end of the primary vessel and being in contact with the fluid such that the fluid is contained within the walls of the vessel, the front face of the piston, and the lower end of the vessel; the back face being mounted on a piston rod; said piston being capable of reciprocally traversing the length of the vessel such that when the front face of the piston is in substantial proximity of the lower end of the vessel, substantially all of the fluid is displaced and removed from the vessel.

4. The apparatus of claim 3, wherein the means for measuring the mass of the fluid leaving a primary vessel is a displacement measuring means provided on the displacement means.

5. The apparatus of claim 4, wherein the displacement measuring means is provided by calibrating the piston rod.

6. The apparatus of claim 3, wherein the piston rod is engaged with a pressuring force means.

7. The apparatus of claim 6, wherein the pressuring force means comprises pressurized hydraulic fluid, compressed air, or an electromechanical means.

8. The apparatus of claim 1, wherein the two or more primary vessels each comprise an accumulator.

9. The apparatus of claim 1, wherein the means for measuring the mass of the a fluid leaving a primary vessel is a load cell.

10. The apparatus of claim 1, wherein the at least two or more secondary vessels, each having walls and an upper and lower end, contain a reciprocating displacement means for displacing the fluids contained in said secondary vessels.

11. The apparatus of claim 10, wherein the displacement means comprises a piston with suitable sealing means having a front face and a back face; the front face facing the lower end of the secondary vessel and being in contact with the fluids such that the fluids are contained within the walls of the secondary vessel, the front face of the piston, and the lower end of the secondary vessel which communicates with communicating means (e); the back face being mounted on a piston rod; said piston being capable of reciprocally traversing the length of the vessel such that when the front face of the piston is in substantial proximity of the lower end of the secondary vessel, substantially all of the fluids have been displaced from the secondary vessel to communicating means (e).

12. The apparatus of claim 11, wherein the piston rod is engaged with a pressuring force means.

13. The apparatus of claim 12, wherein the pressuring force means comprises pressurized hydraulic fluid, compressed air, or an electromechanical means.

14. The apparatus of claim 10, wherein the means for pressurizing the fluids as they are are being oscillated between the secondary vessels is by the displacement means acting on the fluids as they are being displaced.

15. The apparatus of claim 14, wherein the displacement means includes means for measuring the pressure on the fluids and generating a signal in response to such pressure measurement.

16. The apparatus of claim 15, wherein the means for measuring the pressure on the fluids and generating a signal in response to such pressure measurement is a pressure switch.

17. The apparatus of claim 15, wherein the displacement means also includes a switching means responsive to the generated signal which causes the displacement means in one or more of the secondary vessels to stop the displacement of the fluids while causing the displacement means in one or more of the other secondary vessels to begin displacement of the fluids in a synchronized manner.

18. The apparatus of claim 17, wherein the switching means is a solenoid valve.

19. The apparatus of claim 1, wherein the two or more secondary vessels each comprise an accumulator.

20. The apparatus of claim 1, wherein the means for heating the fluids as they are being oscillated between the secondary vessels is located in or on one or more of the secondary vessels.

21. The apparatus of claim 20, wherein the heating means is an electrically heated element.

22. The apparatus of claim 1, wherein the means for heating the fluids as they are being oscillated between the secondary vessels is located in communicating means (e).

23. The apparatus of claim 22, wherein the heating means is a heat exchanger.

24. The apparatus of claim 1, wherein communicating means (e) contains a static mixer.

25. The apparatus of claim 1 additionally containing a spraying means located in communicating means (e).

26. The apparatus of claim 25, wherein the pressurizing means maintains a predetermined pressure on the fluids whether spraying means is acutated or not.

27. A method of forming a heated and pressurized mixture of two or more fluids in a predetermined proportion which comprises:
- a) supplying two or more fluids to two or more primary vessels, one fluid being supplied to one primary vessel, respectively, each primary vessel having a known volume at a predetermined pressure and temperature;
- b) removing at least a portion of one or more of the fluids from a primary vessel, respectively, measuring the mass of each of the fluids removed, and introducing the removed fluids to at least one of at least two or more secondary vessels capable of being pressurized;
- c) removing at least a portion of one or more of the other fluids remaining in the primary vessels in a predetermined proportion, based on the mass of said fluids, relative to the amount of fluids removed in step (b) and introducing the removed other fluids to at least one of the at least two or more secondary vessels capable of being pressurized;
- d) oscillating the fluids from at least one of said secondary vessels to at least one of the other of said secondary vessels, where said oscillation of the fluids provides for their mixing;
- c) pressurizing the fluids as they are being oscillated between the secondary vessels; and
- e) heating the fluids as they are being oscillated between the secondary vessels.

28. The method of claim 27, wherein one or more of the fluids supplied to a primary vessel is a compressible fluid.

29. The method of claim 28, wherein the compressible fluid is carbon dioxide.

30. The method of claim 29, wherein the carbon dioxide is supplied to a primary vessel maintained at room temperature and a pressure in the range of from about 635 to about 1,057 psig.

31. The method of claim 30, wherein the primary vessel is maintained at a pressure in the range of from about 810 to about 915 psig.

32. The method of claim 28, wherein the mass of the compressible fluid removed from the primary vessel is determined from the volume of the primary vessel in which it is contained based on the known pressure and temperature of that vessel.

33. The method of claim 28, wherein the mass of the compressible fluid removed from the primary vessel is determined by the use of a load cell.

34. The method of claim 27, wherein one or more of the fluids supplied to a primary vessel is a non-compressible fluid.

35. The method of claim 34, wherein one or more of the non-compressible fluids is a coating composition.

36. The method of claim 34, wherein the mass of the non-compressible fluid is determined from the volume of non-compressible fluid removed from the primary vessel in which it is contained based on the known density of the non-compressible fluid.

37. The method of claim 34, wherein the mass of the non-compressible fluid removed from the primary vessel is determined by the use of a load cell.

38. The method of claim 27, wherein one or more of the fluids supplied to the primary vessels is a compressible fluid and one or more of the other fluids supplied to the primary vessels is a non-compressible fluid.

39. The method of claim 38, wherein substantially all of the one or more of the compressible fluids is removed from the primary vessels and introduced to the secondary vessels and then at least a predetermined proportional amount of the one or more of the non-compressible fluids is removed from the primary vessels and introduced to the secondary vessels.

40. The method of claim 38, wherein at least a portion of the non-compressible fluids is removed from the primary vessels and introduced to the secondary vessels and then at least a predetermined proportional amount of the one or more of the compressible fluids is removed from the primary vessels and introduced to the secondary vessels.

41. The method of claim 38, wherein the fluids are heated and pressurized to a temperature and pressure such that the compressible fluid is in its supercritical state.

42. The method of claim 41, wherein the compressible fluid is carbon dioxide and the fluids are heated to a temperature of at least 31.3° C. and a pressure of at least 1,057 psig.

43. The method of claim 27, wherein a fluid is removed from a primary vessel by a displacement means located in the primary vessel.

44. The method of claim 43, wherein the displacement means is provided with a displacement measuring device for determining the mass of the fluid leaving a primary vessel.

45. The method of claim 44, wherein the displacement measuring means is provided by calibrating the piston rod.

46. The method of claim 27, wherein the fluids are oscillated from one secondary vessel to another by synchronized displacement of the fluids in one or more of the secondary vessels and introduction of the fluids in one or more of the other secondary vessels.

47. The method of claim 46, wherein the fluids are pressurized by their being displaced from at least one of the secondary vessels and introduced into, at least one of the other secondary vessels.

48. The method of claim 27, wherein the fluids are heated in the secondary vessels.

49. The method of claim 48, wherein the fluids are heated in the vessels by electrically heated elements.

50. The method of claim 27, wherein the fluids are heated by heat exchangers as they are oscillated from the at least one or more secondary vessels to the at least one or more other secondary vessels.

51. The method of claim 27, wherein the at least two or more vessels each comprise accumulators.

* * * * *